United States Patent
Moroishi

(10) Patent No.: US 7,475,931 B2
(45) Date of Patent: Jan. 13, 2009

(54) STIFFENING STRUCTURE AND STIFFENING METHOD FOR AUTOMOTIVE OUTER PANEL

(75) Inventor: Eisuke Moroishi, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/892,871

(22) Filed: Aug. 28, 2007

(65) Prior Publication Data

US 2008/0054675 A1 Mar. 6, 2008

(30) Foreign Application Priority Data

Sep. 5, 2006 (JP) ............................. 2006-240168

(51) Int. Cl.
*B60J 7/00* (2006.01)
(52) U.S. Cl. .................... 296/30; 296/191; 296/193.01; 296/146.6
(58) Field of Classification Search .................. 296/29, 296/30, 191, 146.6, 193.01
See application file for complete search history.

(56) References Cited

U.S. PATENT DOCUMENTS 6,817,652 B2 * 11/2004 Graber et al. ............ 296/146.6

FOREIGN PATENT DOCUMENTS

JP 4-067514 U 6/1992

* cited by examiner

*Primary Examiner*—Joseph D Pape
(74) *Attorney, Agent, or Firm*—Foley & Lardner LLP

(57) ABSTRACT

A stiffening structure for an automotive outer panel of the present invention has an outer-panel side member fixed to the automotive outer panel. Further, the stiffening structure has an annexed member adhered onto an inner surface of the automotive outer panel while interposing an adhesive therebetween at least one end of the annexed member is joined to the outer-panel side member. Furthermore, the stiffening structure has a position adjuster provided on a joint portion of the annexed member and the outer-panel side member. The position adjuster makes the annexed member movable in a direction of approaching the automotive outer panel or moving away therefrom.

7 Claims, 5 Drawing Sheets

STIFFENING STRUCTURE AND STIFFENING METHOD FOR AUTOMOTIVE OUTER PANEL

BACKGROUND OF THE INVENTION

1. Field of the Invention

The present invention relates to a stiffening structure and stiffening method for an automotive outer panel, which are configured to reinforce the automotive outer panel by an annexed member arranged on an inner surface of the automotive outer panel while interposing an adhesive therebetween.

2. Description of the Related Art

As a stiffening structure for an automotive outer panel composing an automotive outside, for example, of a door outer panel, there is one described in Japanese Utility Model Unexamined Publication No. H4-67514 (published in 1992). The structure in Japanese Utility Model Unexamined Publication No. H4-67514 is one in which an annexed member such as a reinforcement bar is arranged along an inner surface of the door outer panel. This annexed member is partially adhered onto the door outer panel while interposing an adhesive such as a mastic therebetween. Moreover, both ends of the annexed member are supported by attachment pieces joined to the door inner panel.

BRIEF SUMMARY OF THE INVENTION

In such a conventional stiffening structure for the automotive outer panel, both of the ends of the annexed member are individually spot-welded to the attachment pieces. Accordingly, the stiffening structure is prone to cause variations in the vehicle width direction with respect to the door outer panel. Therefore, a gap between the annexed member and the door outer panel is widened to some extent, a soft mastic is partially filled into the gap, and the annexed member and the door outer panel are thereby adhered onto each other. However, in the case of this structure, a bumpy appearance occurs on the door outer panel. Moreover, when paint baking is performed in a state where the annexed member is adhered onto the door outer panel by the mastic, the mastic is heat-shrunk. Accordingly, the door outer panel is drawn to the annexed member side, that is, in the inner surface direction of the outer panel, whereby the door outer panel is distorted to deteriorate the appearance of the door outer panel.

The present invention has been made in consideration for the problems as described above. It is an object of the present invention to provide a stiffening structure and stiffening method for the automotive outer panel, which are capable of avoiding the bumpy appearance and distortion of the automotive outer panel, and enhancing panel rigidity of the automotive outer panel.

The first aspect of the present invention provides a stiffening structure for an automotive outer panel, the stiffening structure comprising: an outer-panel side member fixed to the automotive outer panel; an annexed member adhered onto an inner surface of the automotive outer panel while interposing an adhesive therebetween, at least one end of the annexed member being joined to the outer-panel side member; and a position adjuster provided on a joint portion of the annexed member and the outer-panel side member, the position adjuster making the annexed member movable in a direction of approaching the automotive outer panel or moving away therefrom.

The second aspect of the present invention provides a stiffening method for an automotive outer panel in which an annexed member is adhered onto an inner surface thereof in a facing manner while interposing an adhesive therebetween, the stiffening method comprising: temporarily fixing at least one end of the annexed member to an outer-panel side member fixed to the automotive outer panel by a position adjuster provided on a joint portion of the annexed member and the outer-panel side member, the position adjuster making the annexed member movable in a direction of approaching the automotive outer panel or moving away therefrom; baking paint on the automotive outer panel in the state where the annexed member is temporarily fixed to the outer-panel side member; and after baking the paint, completely fixing the temporarily fixed annexed member and outer-panel side member.

The third aspect of the present invention provides a stiffening structure for an automotive outer panel, the stiffening structure comprising: an outer-panel side member fixed to the automotive outer panel; an annexed member adhered onto an inner surface of the automotive outer panel while interposing an adhesive therebetween, at least one end of the annexed member being joined to the outer-panel side member; and position adjusting means provided on a joint portion of the annexed member and the outer-panel side member, the position adjusting means for making the annexed member movable in a direction of approaching the automotive outer panel or moving away therefrom.

BRIEF DESCRIPTION OF THE SEVERAL VIEWS OF THE DRAWING

The invention will now be described with reference to the accompanying drawings wherein.

DETAILED DESCRIPTION OF THE INVENTION

Hereinafter, description will be made of embodiments of the present invention with reference to the drawings.

FIG. 1 to FIG. 6 show an embodiment of a stiffening structure and stiffening method for an automotive outer panel according to the present invention. The stiffening structure and stiffening method for the automotive outer panel according to the present invention can be applied to a door. A description will be made below of this embodiment on the assumption that a door outer panel is the automotive outer panel.

Figure 1:
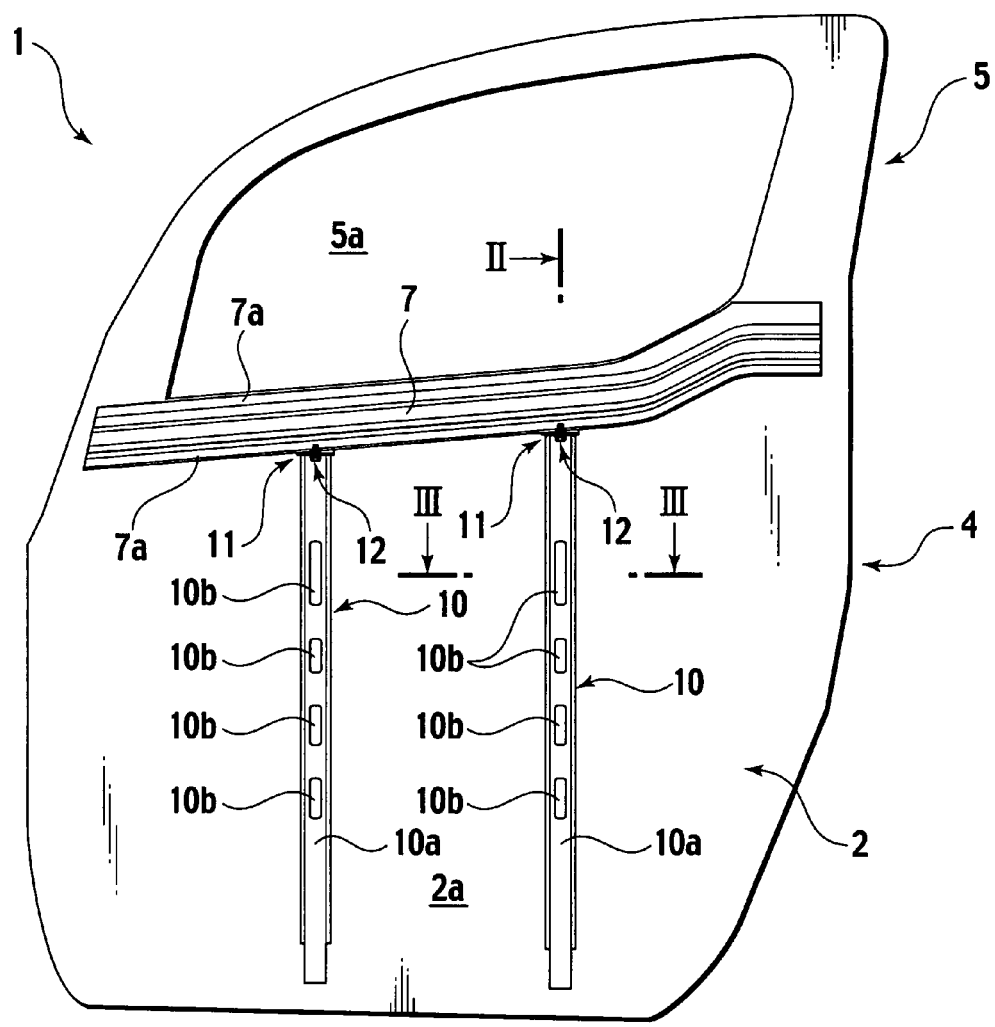
FIG. 1 is a front view of a door outer panel in an embodiment of the present invention when viewed from an inner surface thereof.
Figure 1:
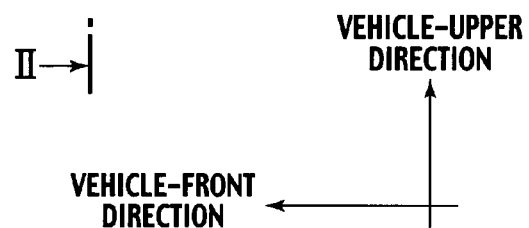
Figure 2:
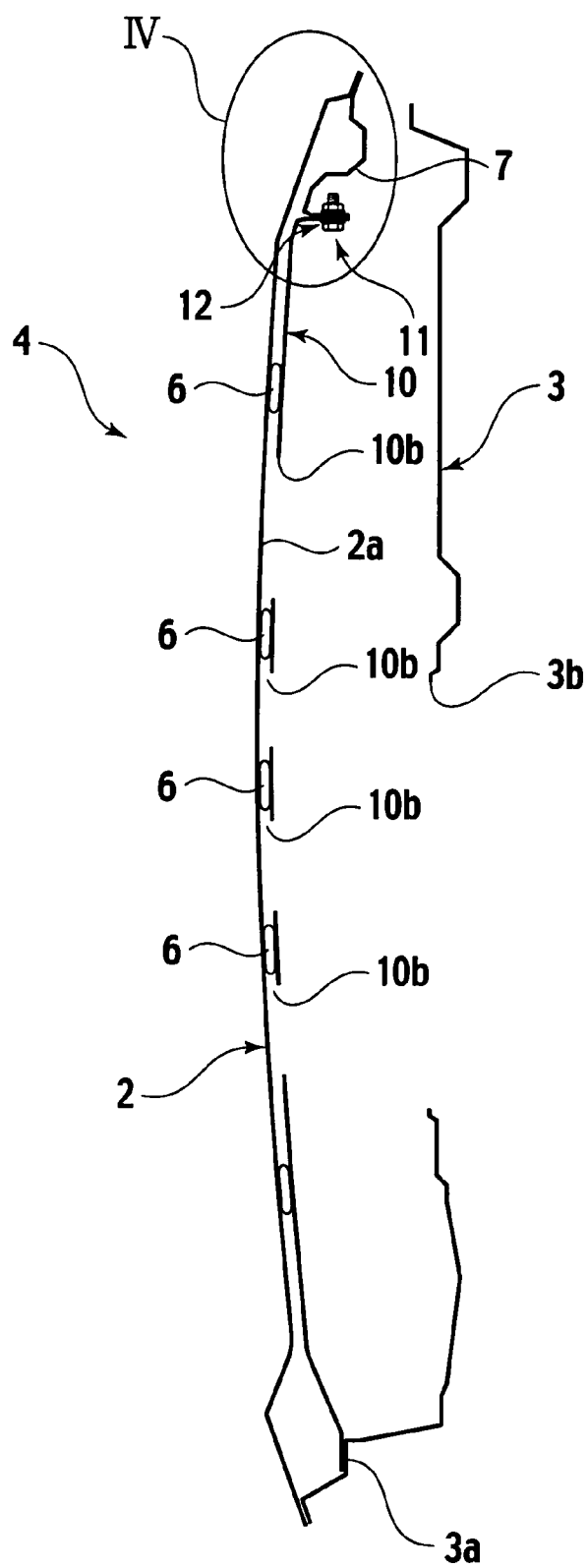
FIG. 2 is a cross-sectional view of a door body in the embodiment of the present invention, where the door body is cut from a portion corresponding to a line II-II of FIG. 1.

As shown in FIG. 1 and FIG. 2, a door 1 to which the stiffening structure of this embodiment is applied is formed of: a door body 4 composed of a door outer panel 2 and a door inner panel 3; and a door window portion 5 having a window opening 5a opened/closed in such a manner that window glass (not shown) ascends/descends. On an inner surface 2a of the door outer panel 2 as the automotive outer panel, stiffeners 10 as reinforcement members, which are channel-like in cross section, are provided. The stiffeners 10 are adhered onto the inner surface 2a of the door outer panel 2 while interposing a mastic 6 as an adhesive therebetween.

As shown in FIG. 1, in this embodiment, the stiffeners 10 are arranged in the up and down direction of a vehicle body. Moreover, two stiffeners 10 are provided substantially parallel to each other at a predetermined interval in the fore-and-aft direction of a vehicle, and are arranged substantially parallel to the inner surface 2a of the door outer panel 2.

To an upper end of the door outer panel 2, a belt-like door waist reinforcement 7 (outer-panel side member) is joined. The door waist reinforcement 7 is provided along a lower side of the window opening 5a in the fore-and-aft direction of the vehicle. The stiffeners 10 are attached onto the door outer panel 2 while interposing the door waist reinforcement 7 therebetween. As shown in FIG. 2, in order to ensure rigidity, the door waist reinforcement 7 has a cross-sectional shape in which a center portion in the up and down direction of the vehicle body swells to the direction of the door inner panel 3. Flanges 7a, 7a provided on both sides of the door waist reinforcement 7 in the up and down direction are fixed to the inner surface 2a of the door outer panel 2.

Figure 3:
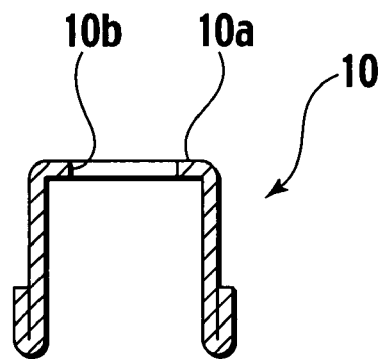
FIG. 3 is an enlarged cross-sectional view of a reinforcement member along a line III-III of FIG. 1.

As shown in FIG. 3, each of the stiffeners 10 is formed into the channel shape in cross section, in which the door inner panel 3 side is opened. Moreover, in a bottom wall 10a of each stiffener 10, which is opposed to the inner surface 2a of the door outer panel 2, a plurality of through-holes 10b are formed at an appropriate interval in the longitudinal direction of the stiffener 10. Moreover, with regard to each of the stiffeners 10, an upper end thereof is joined to the door waist reinforcement 7, and as shown in FIG. 2, a lower end thereof is spot-welded to a step portion 3a formed on a lower edge of the door inner panel 3. Furthermore, the mastic 6 is brought into press contact with the inner surface 2a of the door outer panel 2 in a state of being applied to spots among the through-holes 10b of the bottom wall 10a.

Here, in this embodiment, a position adjuster 12 is provided in each of joint portions 11 of the stiffeners 10 and the door waist reinforcement 7. Specifically, with regard to each stiffener 10 disposed substantially along the up and down direction, the position adjuster 12 is provided on an upper end thereof. Each position adjuster 12 permits the stiffener 10 to make a positional change of approaching the door outer panel 2 or moving away therefrom through the mastic 6. Moreover, each position adjuster 12 makes it possible to completely fix the stiffener 10 to the door waist reinforcement 7 after the position of the stiffener 10 with respect to the door outer panel 2 is firmly determined.

Figure 4:
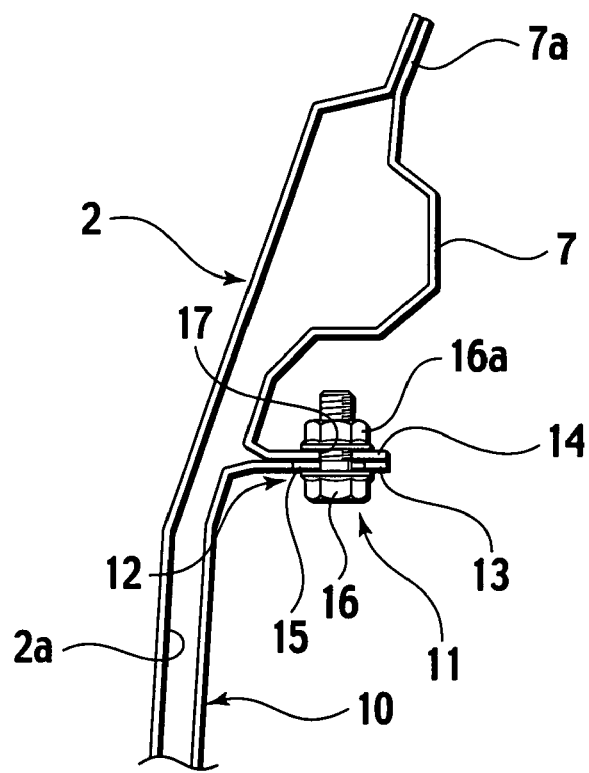
FIG. 4 is an enlarged cross-sectional view of a portion IV in FIG. 2.
Figure 5:
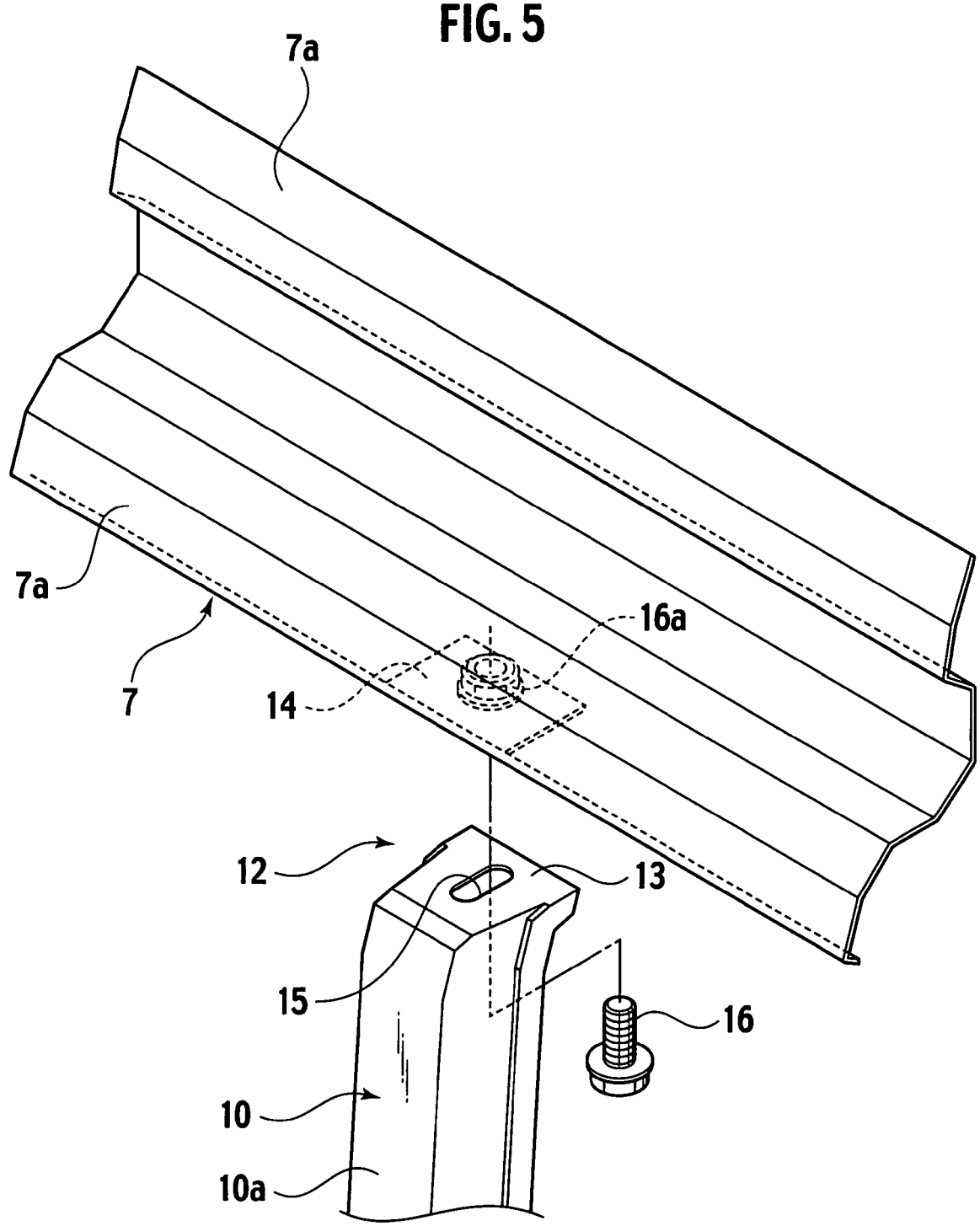
FIG. 5 is an exploded perspective view of a joint portion of the reinforcement member and an outer-panel side member according to the embodiment of the present invention.

On the upper end of each stiffener 10, a substantially horizontal first flange 13 is formed so as to close a terminal end of the channel-like cross section thereof as shown in FIG. 4 and FIG. 5. Meanwhile, on the lower end of the door waist reinforcement 7, to which each stiffener 10 is opposed, a second flange 14 is formed substantially parallel to the first flange 13 to be bent in the direction to the door inner panel 3. When each stiffener 10 is coupled to the door waist reinforcement 7, these first flange 13 and second flange 14 are overlapped with each other.

Then, each of the position adjusters 12 includes: an elongate hole 15; and a bolt 16 and a nut 16a as fastening members. The elongate hole 15 is formed in the first flange 13 of the stiffener 10, and is extended in the direction where the stiffener 10 and the door outer panel 2 are opposed to each other, that is, in the vehicle width direction. The bolt 16 and the nut 16a couple the first flange 13 and the second flange 14 of the door waist reinforcement 7 to each other through the elongate hole 15.

In the second flange 14, an insertion hole 17 for the bolt 16 is formed in a spot thereof corresponding to the elongate hole 15. Onto an upper surface of the second flange 14, the nut 16a is welded coaxially with the insertion hole 17, and the nut 16a is integrated as a weld nut with the second flange 14.

Figure 6:
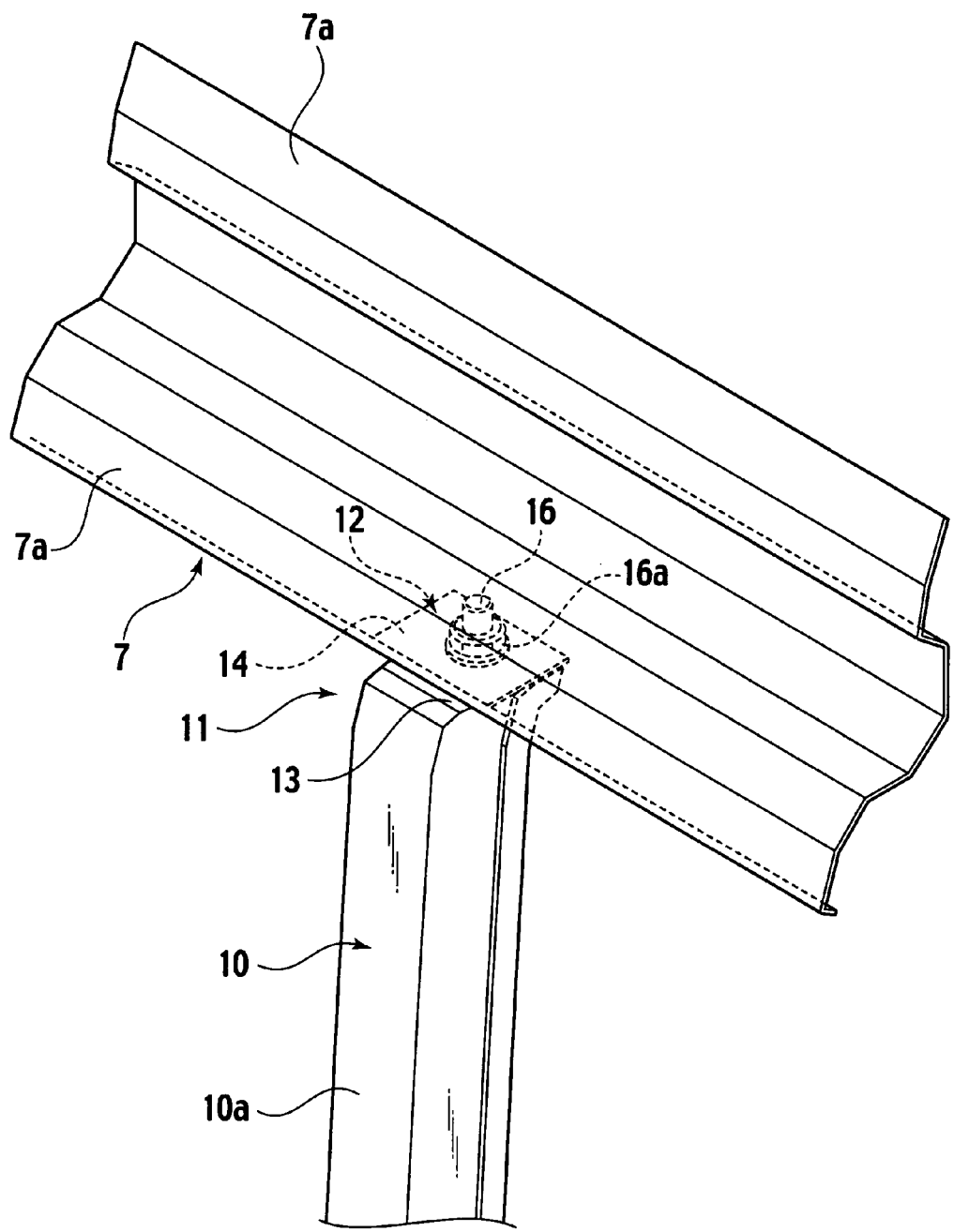
FIG. 6 is a perspective view showing a coupled state of the reinforcement member and the outer-panel side member according to the embodiment of the preset invention.

Then, when the first flange 13 and the second flange 14 are coupled to each other, the bolt 16 is attached onto the nut 16a from below the first flange 13 as shown in FIG. 5. Specifically, the respective flanges 13, 14 are overlapped with each other, the elongate hole 15 and the insertion hole 17 are matched with each other, and thereafter, the bolt 16 is inserted into these elongate hole 15 and insertion hole 17 and is screwed to the nut 16a as shown in FIG. 4 and FIG. 6.

At this time, in a temporarily fastened state of the bolt 16, where the bolt 16 is loosened, the first flange 13 is permitted to move relatively to the second flange 14 in a longitudinal direction (vehicle width direction) of the elongate hole 15. Meanwhile, the bolt 16 is tightened to be firmly fixed, whereby the relative movement between both of the flanges 13 and 14 is inhibited.

Incidentally, paint baking treatment is performed in a state as shown in FIG. 2, where the door inner panel 3 is coupled to the door outer panel 2 onto which the stiffeners 10 are attached. After this baking treatment, assembling of auxiliary parts (not shown) such as a window regulator and a door lock mechanism is performed from a work hole 3b formed in the door inner panel 3. The work hole 3b is covered with a door trim in a final stage.

Hence, the stiffeners 10 will be subjected to the baking treatment in a state of being adhered onto the door outer panel 2 while interposing the mastic 6 therebetween. The mastic 6 is heat-cured at a temperature at the time of the baking, and enhances adhesiveness thereof; however, has property to be heat-shrunk following such heat curing.

Hence, in the stiffening method for the door outer panel 2 (automotive outer panel) according to this embodiment, first, the paint baking treatment is performed in a state where the upper ends of the stiffeners 10 are temporarily fixed to the door waist reinforcement 7 by the position adjusters 12. After this baking treatment, such temporarily fixed portions of the stiffeners 10 and the door waist reinforcement 7 are firmly fixed.

As above, in accordance with the stiffening structure and stiffening method for the door outer panel 2 according to this embodiment, the position adjusters 12 which permit the positional changes of the stiffeners 10 in the vehicle width direction are provided on the joint portions 11 of the door waist reinforcement 7 and the upper ends of the stiffeners 10 adhered onto the inner surface of the door outer panel 2 while interposing the mastic 6 therebetween. Accordingly, a gap between the door outer panel 2 and each stiffener 10 can be narrowed, thus making it possible to eliminate a bumpy appearance of the door outer panel 2. Moreover, in this embodiment, in a period before the paint baking treatment, the bolts 16 of the position adjusters 12 can be loosened, thus making it possible to set the position adjusters 12 in a state where dimensional changes thereof are permitted, that is, in such a temporarily fixed state where the first flange 13 and the second flange 14 are moved relatively to each other. Accordingly, even if the mastic 6 is heat-shrunk by the baking treatment, such heat shrinkage can be absorbed by the positional changes of the position adjusters 12, thus making it possible to prevent distortion from occurring on the door outer panel 2.

As described above, in this embodiment, the distortion of the door outer panel 2 owing to the heat curing of the mastic 6 can be prevented. Accordingly, the mastic that increases the rigidity thereof when being heat-cured becomes usable, and from this fact, coupling strength between the stiffeners 10 and the door outer panel 2 can be increased more. Eventually, strength of the door outer panel 2 can be increased more.

Then, in this embodiment, in a period after the baking treatment, while the heat shrinkage of the mastic 6 is being stabilized, the bolts 16 of the position adjusters 12 are tightened to be firmly fixed. Accordingly, the upper ends of the stiffeners 10 can be surely coupled to the door waist reinforcement 7, thus making it possible to ensure the strength of the door outer panel 2.

Moreover, in this embodiment, the stiffeners 10 are arranged substantially parallel to the inner surface 2a of the door outer panel 2. Accordingly, the gap between the door outer panel 2 and each of these stiffeners 10 becomes substantially constant over the overall length of the stiffener 10, and a thickness of the mastic 6 filled into the gap can be made substantially constant over the overall length of the stiffener 10. Hence, a heat shrinkage amount and adhesive force of the mastic 6 can be made even over the overall length of each stiffener 10, and a reinforcement effect for the door outer panel 2 by the stiffeners 10 can be enhanced.

Moreover, each of the position adjusters 12 is composed by providing: the elongate hole 15 formed in the first flange 13 of the stiffener 10 and extended in the direction where the stiffener 10 and the door outer panel 2 are opposed to each other; and the bolt 16 and the nut 16a which couple the first flange 13 and the second flange 14 of the door waist reinforcement 7 to each other through the elongate hole 15. Accordingly, a configuration of each position adjuster 12 can be simplified. In addition, the bolt 16 is loosened, thus making it possible to set both of the flanges 13, 14 in the temporarily fixed state with ease, and the bolt 16 is tightened, thus making it possible to firmly fix both of the flanges 13 and 14 with ease.

Furthermore, the stiffeners 10 are arranged in the up and down direction of the door outer panel 2, and the position adjusters 12 are provided on the upper ends of the stiffeners 10. Accordingly, the distortion on the side where the window opening 5a is provided, that is, the distortion on the upper end of the door outer panel 2, in which an insertion port for door glass is formed, can be eliminated, thus making it possible to smoothly guide the door glass to ascend and descend.

Incidentally, the description has been made of the present invention by taking the above-described embodiment as an example; however, without being limited to this embodiment, various types of other embodiments can be adopted within the scope without departing from the gist of the present invention. For example, such arranged positions of the position adjusters 12 are not limited to the upper ends of the stiffeners 10 arranged in the up and down direction, and the position adjusters 12 can be provided on the lower ends of the stiffeners 10, or on both of the upper and lower ends thereof.

Moreover, the present invention can also be applied to the case where the stiffeners 10 are arranged in the fore-and-aft direction of the vehicle, or arranged to be inclined with respect to the up and down direction or the fore-and-aft direction. In this case, the position adjuster just needs to be provided on either of both end portions of each stiffener 10.

Furthermore, the elongate holes 15 of the position adjusters 12 can also be formed in the second flanges 14 of the door waist reinforcement 7 without being formed in the first flanges 13 of the stiffeners 10. In this case, the nuts 16a are separated from the second flanges 14 so as to be freely movable relatively thereto.

As a matter of course, without being limited to the door outer panel 2 shown in this embodiment, the present invention can also be applied to an outside plate of the vehicle body, for example, to a roof panel, a fender panel, and the like.

Moreover, the mastic 6 is used as the adhesive in this embodiment; however, the adhesive may be such an adhesive other than the mastic 6, which has heat resistance to heat at the time of the baking treatment.

The entire content of a Japanese Patent Application No. P2006-240168 with a filing date of Sep. 5, 2006 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A stiffening structure for an automotive outer panel, the stiffening structure comprising:
   an outer-panel side member fixed to the automotive outer panel;
   an annexed member adhered onto an inner surface of the automotive outer panel while interposing an adhesive therebetween, at least one end of the annexed member being joined to the outer-panel side member; and
   a position adjuster provided on a joint portion of the annexed member and the outer-panel side member, the position adjuster making the annexed member movable in a direction of approaching the automotive outer panel or moving away therefrom.

2. The stiffening structure according to claim 1,
   wherein the annexed member is a reinforcement member disposed substantially parallel to the inner surface of the automotive outer panel.

3. The stiffening structure according to claim 1,
   wherein the position adjuster includes: an elongate hole formed in the annexed member or the outer-panel side member and extended in a direction where the annexed member and the automotive outer panel are opposed to each other; and a fastening member that couples the annexed member and the outer-panel side member through the elongate hole.

4. The stiffening structure according to claim 1,
   wherein the automotive outer panel is a door outer panel, and the annexed member is disposed substantially along an up and down direction of a vehicle body.

5. The stiffening structure according to claim 1,
   wherein the automotive outer panel is a door outer panel, and the position adjuster is provided on at least an upper end of the annexed member.

6. A stiffening method for an automotive outer panel in which an annexed member is adhered onto an inner surface thereof in a facing manner while interposing an adhesive therebetween, the stiffening method comprising:
   temporarily fixing at least one end of the annexed member to an outer-panel side member fixed to the automotive outer panel by a position adjuster provided on a joint portion of the annexed member and the outer-panel side member, the position adjuster making the annexed member movable in a direction of approaching the automotive outer panel or moving away therefrom;
   baking paint on the automotive outer panel in the state where the annexed member is temporarily fixed to the outer-panel side member; and
   after baking the paint, completely fixing the temporarily fixed annexed member and outer-panel side member.

7. A stiffening structure for an automotive outer panel, the stiffening structure comprising:
   an outer-panel side member fixed to the automotive outer panel;
   an annexed member adhered onto an inner surface of the automotive outer panel while interposing an adhesive therebetween, at least one end of the annexed member being joined to the outer-panel side member; and
   position adjusting means provided on a joint portion of the annexed member and the outer-panel side member, the position adjusting means for making the annexed member movable in a direction of approaching the automotive outer panel or moving away therefrom.

* * * * *